Nov. 1, 1966 A. DEAKIN 3,282,127
BALANCE CORRECTING UNIT FOR ROTATING SHAFTS, ETC.
Filed Jan. 10, 1964 2 Sheets-Sheet 1

INVENTOR
Alfred Deakin
BY Eugene E. Stevens and/or
Raymond H. Stevens
ATTORNEYS

Nov. 1, 1966   A. DEAKIN   3,282,127
BALANCE CORRECTING UNIT FOR ROTATING SHAFTS, ETC.
Filed Jan. 10, 1964   2 Sheets-Sheet 2
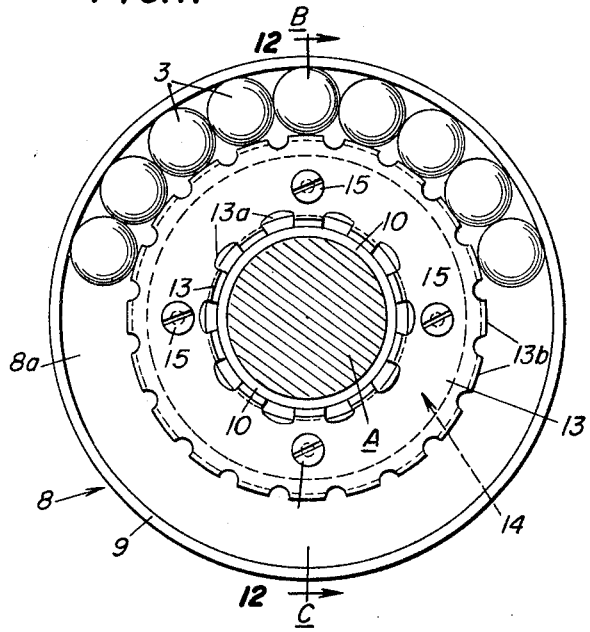
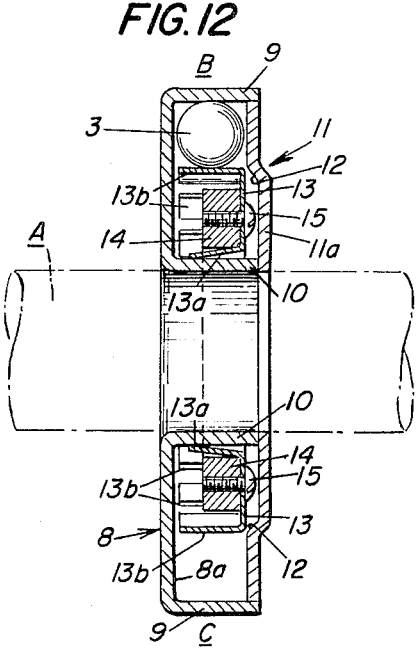
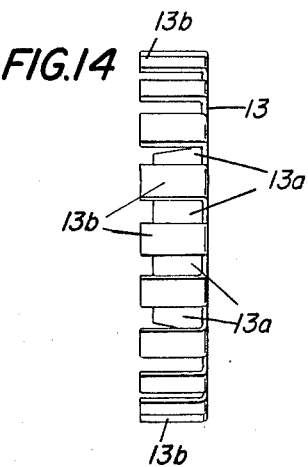
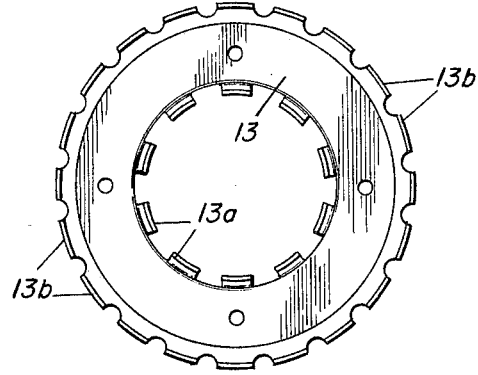
INVENTOR,
Alfred Deakin
BY Eugene E. Stevens
Raymond H. Stevens
ATTORNEYS

United States Patent Office 3,282,127
Patented Nov. 1, 1966

3,282,127
BALANCE CORRECTING UNIT FOR
ROTATING SHAFTS, ETC.
Alfred Deakin, Sebastopol, Calif.
(580 Jean St., Apt. 2, Oakland Calif. 94610)
Filed Jan. 10, 1964, Ser. No. 337,021
7 Claims. (Cl. 74—573)

My invention relates to improvements in automatically operable balance-correcting units for shafts and other rotary elements.

Briefly and generally stated, the invention contemplates a long lived and highly simplified device for the purpose specified which is highly efficient in practical use, economical to manufacture, easy to install, and while applicable to rotating units generally is particularly suited for application to the driven shafts of single piston internal combustion engines such as are commonly used for lawn mowers, scooters, etc.

A highly important feature of the invention is the provision of means which will normally maintain the weight balls at the "light side" of the rotary element whether the latter is stopped or in motion.

Another object is to provide, in a unit of this class, a minimum element-incorporating means for assuring proper balance-correcting positioning of the balls at all rotational speeds of said element.

A further object of the invention is to furnish a unit as characterized which will operate to restore rotary element balance in the event that a part of the latter is thrown off while the apparatus is in operation; or when one side of the rotary element acquires additional load during operation as in the case of rotary grinding elements.

As will be understood and appreciated by those versed in the art, invention also resides in certain novel features of construction, combination and arrangement of the various parts, and in modes of operation thereof, reference being had to the accompanying drawings which disclose two forms of the invention. It is to be understood, however, that the present illustration is to be taken as illustrative rather than limitative, as my inventive concept is suseptible of other mechanical expressions within the spirit and scope of the subject matter claimed hereinafter.

In the drawings, wherein the same reference characters have been used to designate the same parts wherever they appear in the several views:

FIG. 11 is a plan view similar to FIG. 1 but showing a modified form of the invention;

FIG. 12 is a sectional view taken on the line 12—12 of FIG. 11;

FIG. 13 is a plan view of the activating ring of FIG. 12 with the spring-incorporating annulus attached thereto; and FIG. 14 is a side elevation view of the spring-incorporating annulus detached from the activating ring of FIGS. 12 and 13.

Figure 1:
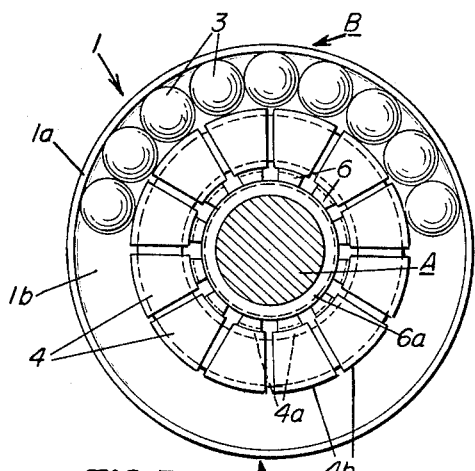
FIG. 1 is a plan view of my unit with the cover 2 of FIG. 2 removed.
Figure 2:
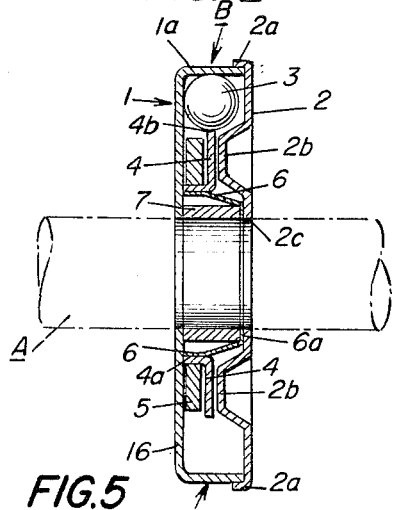
FIG. 2 is a sectional view taken on the line 2—2 of FIG. 1 but showing the cover in place and illustrating the shaft in dotted lines.
Figure 3:
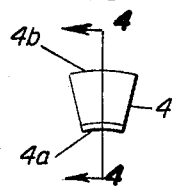
FIG. 3 is a detail view of one of the ball-engaging segments.
Figure 4:
FIG. 4 is a sectional view of one of the segments of FIG. 3 and taken on line 4—4 of FIG. 3.

Referring to the drawings by reference characters and turning to the first illustrated form of the invention shown in FIGS. 1–10, inclusive, numeral 1 indicates an annular cup form shell which is fast on the rotary shaft A of a motor or other member, said shell having a concentric opening for the shaft A and also providing the circumferential outwardly extending flange 1a and base portion 1b. As shown in FIG. 2, base wall portion 1b of shell 1 bears against and is preferably secured to one side of the shaft-carried and inwardly extending hub-like spacer ring 7 fast on shaft A.

Figures 8, 9:
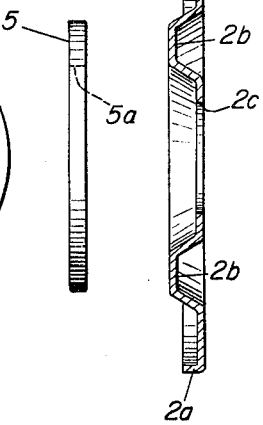
FIG. 8 is an edge elevation of the activating ring of FIG. 7.
FIG. 9 is a sectional view through the cover of FIG. 2 taken on the line 9—9 of FIG. 10.
Figure 10:
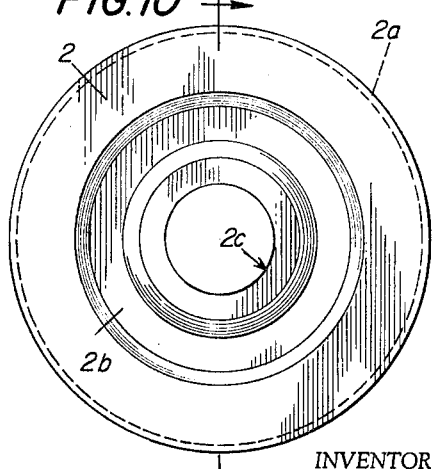
FIG. 10 is a plan view of the cover shown in FIGS. 2 and 9.

The unit as shown in FIG. 2 is provided with the cover or closure 2 which is also shown in FIGS. 9 and 10, said cover or closure having the inturned marginal flange 2a which fits exteriorly of the flange 1a of the member 1, as indicated in FIG. 2. The closure 2 has the concentric opening 2c through which the shaft A passes as indicated in FIGS. 1 and 2.

In further carrying out the invention, the cover or closure 2 has the inwardly extending circumferential indentation 2b whose inner surface provides one side of the guide race for weighted balls 3. Wall 1b provides the other ball race side and 1a its outer wall. An annular series of inwardly and outwardly shiftable ball 3 engageable segments 4 defines the inner ball guide periphery.

FIGURE 1 shows that the ball elements 3 will occupy a distance substantially less than the diameter of the shell and closure-provided ball guide.

In further carrying out the invention, it will be noted that the above mentioned ball-engaging segments 4 have their inner ends provided with feet 4a. These feet 4a bear against the base wall 1b of the member 1, as shown in FIG. 1, so as to space the ball-engaging segments 4 in close adjacency to both the closure-provided protuberence 2a and to a weighted activating ring 5 (see FIG. 2) which will be dealt with shortly.

The internal diameter of activating ring 5 is substantially greater than the exterior diameter of the aforementioned hub-like shaft-carried spacer ring 7 the free end of which serves to limit inward movement of the closure 2. The free end of spacer ring 7 also cooperates with closure 2 (see FIG. 2) in providing a mount for the annulus 6a which provides the circumferential series of spaced spring elements 6 which latter normally bear against the inner surfaces of the foot portions 4a of segents 4 to urge same outwardly to engage their arcuate outer ends with any opposed balls 3.

Still referring to FIGS. 1–10, inclusive, it will be understood that the location of balls 3 is at the "light sides" B of shaft A so that the latter will be in balance; and that the ball-engaging segments 4 are guided between the activating ring 5 and the annular inward protruberance 2b of the cover or closure 2.

The "heavy" side of shaft A is indicated by reference character C.

The FIGS. 11–14 form of the invention

Turning now to the form of invention shown in FIGS. 11, 12, 13, and 14, the rotary shaft A has fast thereon the annular, outwardly open case or shell 8 having the inner wall 8a and the endless outwardly extending marginal flange 9. This flange 9 provides the outer wall of an annular guideway for the plurality of balls 3, as in FIGS.

1–10. However, the case or shell 8 provides the concentric inwardly extending hub-like central flange, as a shaft-carried substitute for 7 of FIGS. 1–10.

A closure 11 is provided for the outwardly open end of case 8 and has a concentric opening for shaft A which aligns with the circular flange 10 provided shaft opening of case 8. Case flange 10 also serves to abut closure 11 to prevent undesired inward movement. The outer closure edge frictionally engages the inner periphery of the case flange 9.

Closure 11 has the outwardly extending central portion 11a which provides the internal circumferential shoulder 12 whose function will be mentioned shortly.

Figure 5:
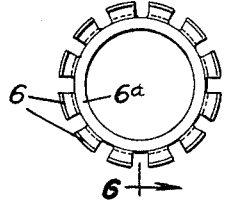
FIG. 5 is a plan view of an annulus which provides a plurailty of spaced ball-engaging spring elements.
Figure 6:
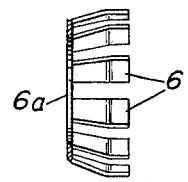
FIG. 6 is a side view of the annulus of FIG. 5.
Figure 7:
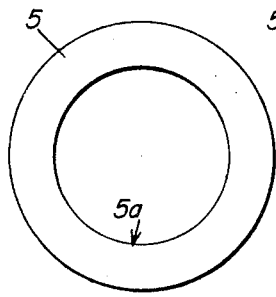
FIG. 7 is a plan view of the weighty activating ring which shifts axially of the shaft in the direction of the heavy side of the latter when there is a condition of imbalance.

In lieu of the multiple leaf spring carrying annulus 6a of FIGS. 5 and 6, I provide the spring metal annulus 13 which surrounds the shaft-receiving flange 10 of case 8 and provides the inner and outer circular series 13a, 13b of laterally spaced spring fingers. This spring finger-providing annulus 13 is secured to one side of the weighted activating ring 14 by means of screws 15 so that the respective series of spring fingers 13a, 13b are spaced from the inner and outer peripheries of activating ring 14. Spring fingers 13a engage the shaft-receiving case flange 10 to floatingly support ring 14; and fingers 13b provide the inner wall of the ball guideway whose outer wall is provided, as previously mentioned, by the flange 9 of the member 8.

Objectional excessive outward movement of the activating ring and annulus assembly 13, 14 is prevented by engagement of the heads of screws 15 (see FIG. 12) with the previously mentioned closure-provided shoulder 12.

As in FIGS. 1 and 2, the "light" side of shaft A is designated as B; and the "heavy" side as C in FIGS. 11 and 12. Also the balls 3 are shown in shaft balancing position at the "light side" B of shaft A.

*Operation described*

In FIGS. 1 and 2 the balls 3 being at the "light" side B of shaft A, instead of at the "heavy" side C thereof (or elsewhere), the shaft A is in balance with the outer ends 4b of segments 4 in engagement with balls 3. Thus when rotation of the engine or other shaft A commences there will be no shaft-induced vibratory movement of the floating spring 6 supported activating ring 5, and said segments 4 at the "light side" B of shaft A will prevent ball movement due to initial inertia plus ball 3 weight.

However, if when shaft A rotation commences with the balls 3 in other than their "light" shaft side balancing position of FIGS. 1 and 2, a vibratory motion of the floating spring series supported activating ring 5 will be set up. Initial activating ring 5 movement will be toward the "heavy side" C of shaft A causing the inner periphery of said ring 5 to act upon the feet 4a of the "light side" B to pull the latter inwardly from their ball-intercepting position of FIGS. 1 and 2. Subsequently, said activating ring 5 partakes of some movement in all other directions to briefly pull other regional segments 4 inwardly so that shortly the balls 3, due to centrifugal action and segment 4 retraction will have assumed the shaft A balancing position of FIGS. 1 and 2.

Should the initial imbalance of shaft A change during shaft rotation, as for instance due to separation therefrom of a shaft-carried element; or by a load increase at one shaft side, as in the case of the shaft of a grinding machine, then activating ring 5 will function as previously described to restore shaft A balance.

Also to be noted is the fact that owing to centrifugal force and the weight of balls 3 there will be a crowding action in the direction of "light" shaft side B and this will overcome any braking action of heavy side C and adjacent segments 4.

An important fact to be noted is that when shaft A stops the action of the "light side" B segments 4 will retain same in shaft balancing position. Thus, there will be no ball 3 shifting unless the shaft A is re-started at high speed.

Another important point to note is that centrifugal action will move the "light side" B elements 4 to the yielding but operative ball-retaining FIG. 1 position without the benefit of the actuating springs 6 (FIG. 1) or 13b (FIGS. 11–14). However, if the aforementioned springs 6, 13b do not act upon the ball retainers, same will not be effective unless the shaft A is rotating.

*Operations of FIGS. 11–14 form*

The operation of this form of the invention will be readily understood from the stated operation of the FIGS. 1–10 form. When 14 shifts transversely of the axis of shaft A toward, for instance, the heavy shaft side C, 13, 13b will shift with it, due to compression of 13a at the "light side" B of shaft A, 13 being attached to 14 by 15. The engagement of 15 with the closure recess 11a provided shoulder 12 prevents an objectional degree of radial outward movement of the assembly 12, 13 in all directions.

Having thus described my invention, what I claim is:

1. In a balancer unit for shafts and other rotarily driven elements having a heavy side and a light side, said balancer unit including weighty balls and means defining a circumferential ball-receiving and confining path about the axis of the shaft or other driven elements; said balls occupying substantially less than the circumference of said path; the improvement which comprises an annular inner wall-providing but outwardly open ball carrier concentrically and fixedly mounted on the shaft, the inner wall of said carrier providing an outwardly extending circumferential flange defining the outer margin of said ball path, a removable closure secured to the open outer portion of said carrier, a shaft-surrounding weighty annular member in said carrier and having an internal diameter greater than the shaft diameter, circumferentially arranged yielding means interposed between the shaft and the inner periphery of said annular weighty member whereby to floatingly support the latter in concentric relationship with the shaft when the latter is in motion with the balls in operative shaft balancing position at the "light side" of the latter or when the shaft is stationary, a circumferential series of radially shiftable ball-engageable elements in said carrier and actuated outwardly by yielding means to normally engage balls in said ball path, cooperating means provided by annular weighty member and the ball engageable elements for moving inwardly those of the latter remotely located with reference to the direction of movement of the weighty member under centrifugal shaft-rotation-induced action so long as the shaft is out of balance.

2. The structure of claim 1, and said closure having an inwardly extending annular shoulder in guide space providing opposition to one side of the annular weighty member, each of said radially shiftable ball-engaging elements working in said guide space and having a lateral inner end-provided foot which is interposed between the inner periphery of said weighty annular member and said yielding means.

3. The structure of claim 1 and said closure having an inwardly extending annular shoulder in guide space providing opposition to one side of the annular weighty member, each of said radially shiftable ball-engaging elements working in said guide space and having a lateral inner end-provided foot which is interposed between the inner periphery of said weighty annular member and said yielding means, and a hub-form spacer within said carrier as a part of said shaft and limiting inward movement of said carrier closure.

4. The structure of claim 1, and a shaft-carried annulus located at one side of said annular weighty member and providing the aforesaid yielding means.

5. The structure of claim 1 and an outwardly extending shaft-receiving hub extending from the inner wall of said carrier and having a free end adjacent said closure, an annulus confined between said hub end and closure and fixedly carrying said yielding means.

6. The structure of claim 1, and a plate form annulus secured to one side of said annular weighty member, said yielding means fixedly carried by the inner periphery of said annulus and other circle form yielding means at the outer periphery of said annulus disposed in operative opposition to said weighty balls.

7. The structure of claim 6, and said ball-engageable elements comprising laterally leaf spring-like elements overlying and spaced from the outer periphery of said annular weighty member.

References Cited by the Examiner
UNITED STATES PATENTS 3,109,321  11/1963  Rogers _____ 74—573

FRED C. MATTERN, JR., *Primary Examiner.*

BROUGHTON G. DURHAM, *Examiner.*

W. S. RATLIFF, *Assistant Examiner.*